United States Patent [19]

Bartlett et al.

[11] 4,132,646

[45] Jan. 2, 1979

[54] SEPARATING DEVICE

[75] Inventors: Peter J. Bartlett, Maidenhead; Herbert D. B. Taylor, London, both of England

[73] Assignee: Lucas Industries Limited, Birmingham, England

[21] Appl. No.: 852,914

[22] Filed: Nov. 18, 1977

[30] Foreign Application Priority Data

Dec. 10, 1976 [GB] United Kingdom .............. 51606/76

[51] Int. Cl.² .............................................. B01D 21/24
[52] U.S. Cl. ................................... 210/114; 210/115; 210/123
[58] Field of Search .............. 210/100, 109, 123, 114, 210/115; 55/219

[56] References Cited

U.S. PATENT DOCUMENTS

| 1,732,222 | 10/1929 | Cantrall | 210/123 X |
| 3,386,581 | 4/1968 | Gough | 210/100 X |
| 3,507,098 | 4/1970 | Veres et al. | 55/219 |
| 3,868,321 | 2/1975 | Gough | 210/115 X |

FOREIGN PATENT DOCUMENTS 656533  5/1929  France .................................... 210/114

Primary Examiner—John Adee

[57] ABSTRACT

A device for separating a first liquid from a second liquid contaminated by the first liquid comprises a casing having an inlet and an outlet in the upper region of the casing, the separated first liquid collecting in the lower portion of the casing, a float which is arranged to float on the separated first liquid, the vanes for guiding the movement of the float and a seating in the upper part of the casing which forms a valve with the float, to prevent flow of liquid to the casing when the level of the first liquid rises above a predetermined level.

8 Claims, 1 Drawing Figure

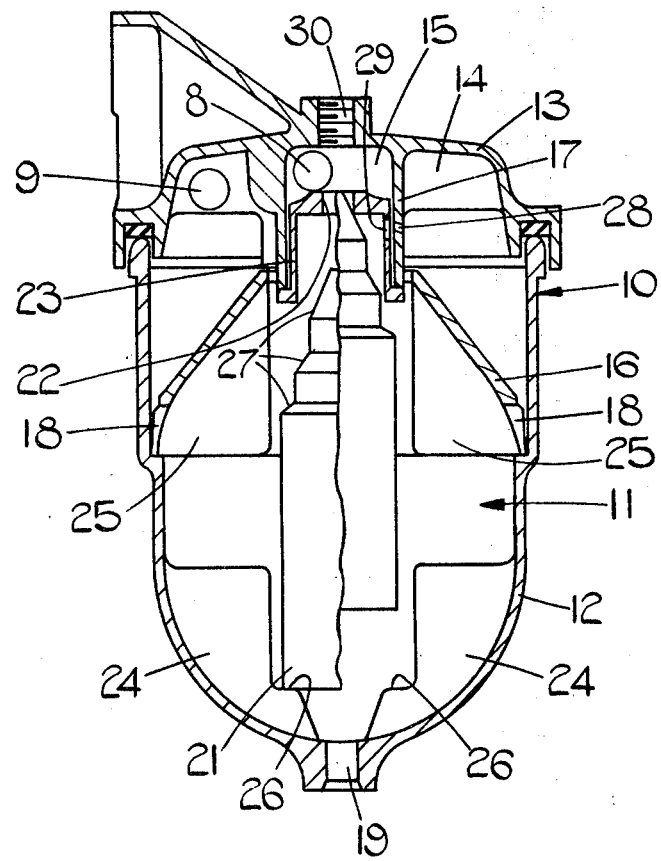

SEPARATING DEVICE

This invention relates to a device for substantially separating a first liquid from a second liquid which is contaminated by first liquid.

According to the present invention, there is provided a device for the purpose specified comprising a casing defining a chamber, an inlet for conveying to the chamber said second liquid contaminated by said first liquid, an outlet for conveying from the chamber second liquid from which said first liquid has substantially been separated, the separated first liquid being collected in a lower portion of the chamber in use, and a valve for controlling the flow of liquid through the chamber, the valve including a seating and a float adapted to engage the seating and arranged to float on the separated first liquid in the lower portion of the chamber, the float being constrained to movement towards and away from the seating by a plurality of vanes disposed between the float and an inner wall of the casing.

Conveniently, the vanes are mounted on, and are preferably integral with the inner wall of the casing and extend inwardly therefrom the float being accommodated between inner ends of the vanes.

Desirably, there are four such vanes equi-angularly spaced about the float.

Most preferably, the inner ends of the vanes are stepped so as to define a stop for the float in its movement away from the seating.

Advantageously, the device further comprises a substantially frusto-conically shaped element disposed in the chamber, a gap or gaps being defined between the wider end of the element and the inner wall of the casing, liquid flowing from the inlet to the outlet via the gap or gaps in use, and a further plurality of vanes are disposed between the float and the element.

Conveniently, the further vanes are mounted on, and are preferably integral with the element and extend inwardly therefrom, the float being accommodated between the inner ends of the further vanes.

Desirably, four further vanes are provided which are equi-angularly spaced about the float.

An embodiment of a device in accordance with the present invention will now be described by way of example, with reference to the accompanying drawing which is an axial section taken through the device for substantially separating water from diesel fuel contaminated thereby.

The device comprises a casing 10 defining a chamber 11 therein, the casing 10 including a bowl-shaped part 12 and a head part 13 in mutual fluid-tight engagement. In the head part 13 are formed an inlet 9 for conveying deisel fuel contaminated with water to the chamber 11 via an inlet chamber, 14 and an outlet 8 for conveying from the chamber 11 via an outlet chamber 15 diesel fuel from which the water has been substantially separated.

Disposed in the chamber 11 and resting on a shoulder formed in casing part 12 is a sedimenter element 16 of substantially frusto-conical form. The narrower end of element 16 is a loose fit around a hollow spigot 17 projecting into the chamber 11 and forming part of the head part 13, the wider end of element 16 is formed with cutouts 18 in its periphery which define gaps between the element 16 and the inner wall of casing 10. The element 16 is so arranged that liquid passing from the inlet to the outlet flows through the gaps defined by the cutouts 18. Water tends to separate out from the diesel fuel and collects in the lower portion of the casing part 12. This water can be drained by means of a drain plug (not shown) which engages in an aperture 19 at the base of casing part 12.

A float 21 whose density is intermediate the densities of diesel fuel and water is disposed in the chamber 11, and is shaped to co-operate with a seating 22 defined by a member 23 located in the spigot 17 to form a valve which controls the flow of liquid from the chamber 11 to the outlet 8. The float 21 is arranged to float on the water which collects in the casing part 12, and is arranged to engage the seating 22 so as to stop the flow of liquid to the outlet when the collected water reaches a predetermined level. This prevents slugs of water from being conveyed to the outlet which would tend to happen if the valve were not provided and the water level were to rise beyond the aforesaid predetermined level. The position of the float 21 when it engages the seating 22 is shown in the right hand side of the drawing.

The float 21 is constrained to move towards and away from the seating 22 by four vanes 24 (only two of which are shown) integral with the lower portion of casing part 12, and a further four vanes 25 (only two of which are shown) integral with the sedimenter element 16. The vanes 24 extend inwardly from the inner wall of the casing 10 and are equi-angularly spaced about the float 21, the float being accommodated between their inner ends. The inner end of each vane 24 is stepped at 26 so as to define a stop for the float in its movement away from the seating 22, the stop serving to hold the float 21 away from the base of casing part 12 when the collected water is removed therefrom or when the water level is low. The position of the float 21 when it engages the stop is shown in the left hand side of the drawing. The vanes 25 extend inwardly from the sedimenter element 16 and are equi-angularly spaced about the float 21, the float being accommodated between the inner ends of the vanes 24. As shown each vane 24 is aligned with a respective one of the vanes 25 and is spaced therefrom in the axial direction of the casing 10. Alignment is not essential however.

The arrangement of vanes 24, 25 prevents solid sediment contained in the diesel fuel from building up in a manner so as to affect the operation of the device by jamming movement of the float. The design of the float, vanes and seat is such that the device can be operated satisfactorily with its axis inclined at up to 45° from the vertical. In addition, the upper end of the float 21 is shaped so as to be provided with inclined annular steps 27, tending to prevent accumulation of solid sediment thereon which would otherwise prevent the float 21 from engaging the seating 22 properly and would also alter the apparent density of the float. Moreover, the diameter of the upper end of the float and the diameter of the seat moulding are such that over the last portion of the valve travel the fuel flow tends to close the valve, and also minimise bouncing.

A venting orifice 28 is provided in the spigot 17 and communicates with an aperture 29 in the member 23. The orifice 28 and aperture 29 permit air to pass from the inlet chamber 14 to the outlet chamber 15, the orifice 28 being sufficiently small to allow only a very small proportion of the total flow of liquid to pass therethrough. The outlet chamber 15 communicates with atmosphere by means of an air bleed aperture 30, which is normally closed by a plug (not shown). The aperture 30 can be opened to facilitate draining of the casing part 12 and also can be opened to hasten the process of lowering the float when in use it has moved into engagement with the seating.

As indicated above, the density of the float 21 is intermediate the densities of water and diesel fuel. In fact, the specific gravity of the float 21 is greater than 0.83 and less than 1.0. In practice, an optimum value is chosen so that the float is sufficiently heavy that movement of the device will not cause it to shut off liquid flow to the outlet 8 prematurely, and sufficiently light that the largest practical closing force of the float on the seating 22 can be used. Preferably, the specific gravity of the float is 0.90 to 0.92. It is to be appreciated that the outlet of the device will be connected to a feed pump or fuel injection pump in use, and that the suction at the outlet produced by the pump will tend to hold the float 21 in engagement with the seating 22 once they have engaged.

We claim:

1. A device for substantially separating a first liquid from a second liquid which is contaminated by the first liquid, comprising: a casing defining a chamber and an inner wall, an inlet for conveying to the chamber said second liquid contaminated by said first liquid, an outlet for conveying from the chamber second liquid from which said first liquid has substantially been separated, the separated first liquid being collected in a lower portion of the chamber in use, and a valve for controlling the flow of liquid through the chamber, the valve including a seating and a float adapted to engage the seating and arranged to float on the separated first liquid in the lower portion of the chamber, a plurality of vanes having inner ends and constraining the float to movement towards and away from the seating, said vanes being disposed between the float and said inner wall of the casing and being mounted on the inner wall of the casing, the float being accommodated between the inner ends of the vanes, the inner ends of the vanes being stepped so as to define a stop to limit the extent of movement of the float away from the seating, a substantially frusto-conically shaped element disposed in the chamber, a gap or gaps being defined between the wider end of the element and the inner wall of the casing, a liquid flowing from the inlet to the outlet via the gap or gaps in use, and a further plurality of vanes disposed between the float and the element, said further vanes being mounted on the element and extending inwardly therefrom, the float being accommodated between the inner ends of the further vanes.

2. A device according to claim 1 in which the casing is defined by a bowl shaped part and a head part which closes the open upper end of the bowl shaped part, said head part defining said inlet and said outlet and a hollow depending spigot, said element having its narrower end aperture located about said spigot, and said seating being defined on a member which is located in said spigot.

3. A device according to claim 2 in which said vanes and said further vanes are formed integrally with said casing and said element respectively and are equi-angularly spaced about the casing and element.

4. A device according to claim 1 in which said float is of cylindrical form and has a conical upper end for co-operation with the seating.

5. A device according to claim 4 in which the upper end of the float is provided with a plurality of inclined steps.

6. A device according to claim 5 for use in the case where the first liquid is water and the second liquid is fuel oil, and in which the specific gravity of the float is greater than 0.83 and less than 1.00.

7. A device according to claim 6 in which the specific gravity of the float is between 0.90 and 0.92.

8. A device according to claim 3 in which said element has its wider rim located upon a step defined in the periphery of the bowl part.

* * * * *